Nov. 30, 1948. P. W. ABELES 2,455,153
COMPOSITE STRUCTURAL MEMBER
Filed Feb. 25, 1943 2 Sheets-Sheet 1
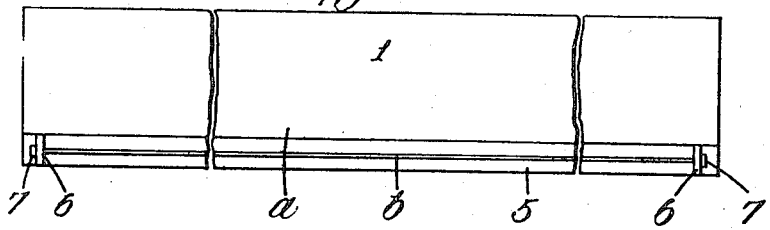
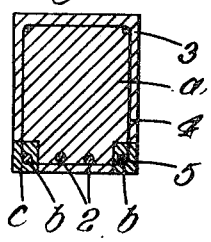
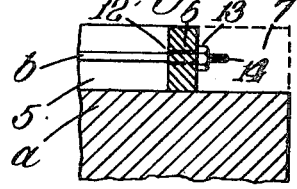
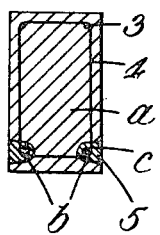
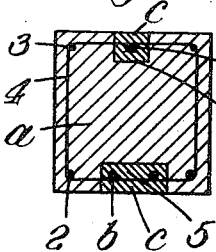
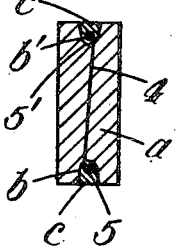
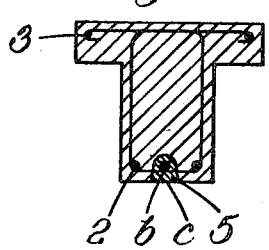
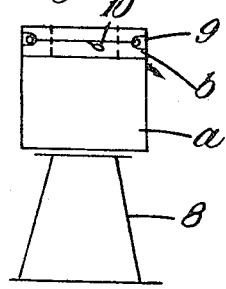
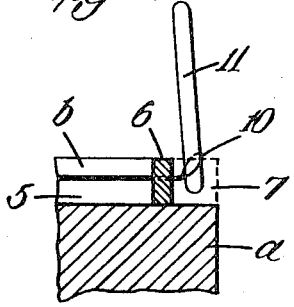
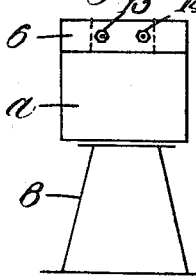
Inventor
Paul William Abeles
By John E Eastlack
attorney

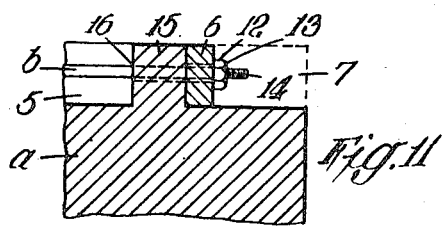
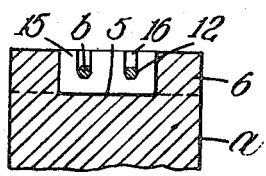
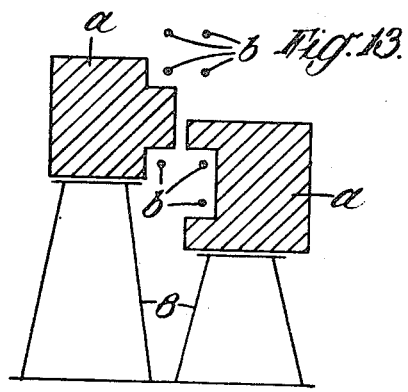
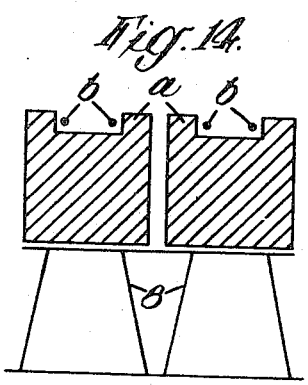
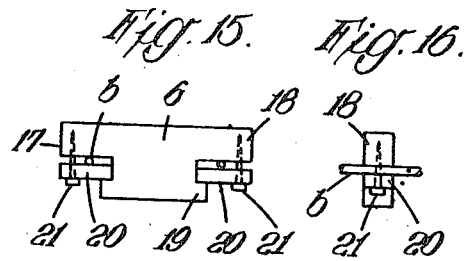
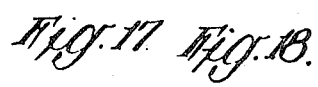
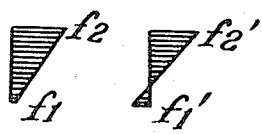
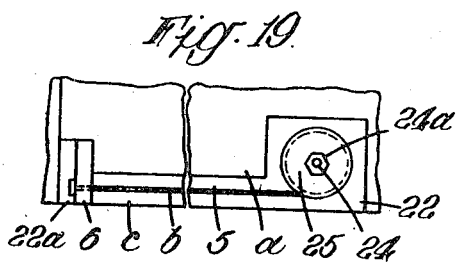
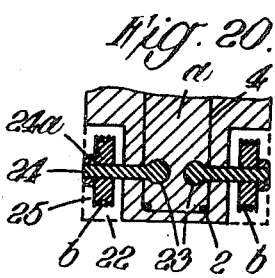

Patented Nov. 30, 1948

2,455,153

UNITED STATES PATENT OFFICE 2,455,153

COMPOSITE STRUCTURAL MEMBER

Paul William Abeles, London W. 11, England

Application February 25, 1943, Serial No. 477,118
In Great Britain March 3, 1942

10 Claims. (Cl. 72—61)

My invention relates to a composite structural member, intended in use to be strained mainly by bending, such as a beam, girder, floor, frame or the like, and relates more particularly to a combination of preformed elements and tensioned ties.

The object of the present invention is to provide a composite structural member of the kind described above, consisting of three components, comprising a first component of considerable compressive strength formed in an integral whole by molding from a plastic, non-metallic substance, which molded component may be steel reenforced, having one or more straight, symmetrically arranged, grooves formed in at least one tensile zone, a second component consisting of at least one metal tie member disposed in said groove of said molded component and having applied thereto a tensile prestress in excess of 20,000 p. s. i. in such a way that the tensile force thus produced is of uniform magnitude entirely throughout the length of said tie member, and a third component consisting of a filler substance arranged in said groove in said molded component, there being persistent an effective tensile force in the tie, and consequently also a compression transmitted to the molded component, of predetermined minimum value after all possible losses of the prestress owing to shrinkage and plastic flow have taken place.

Another object of my invention is to ensure the uniformity of the tensioning force throughout the length of the structural member by preventing the tie component from touching the molded component during the tensioning process, this being attained either by tensioning the tie component before said tie component is placed into the groove and the pre-compression is transmitted to the molded component, or by locating the untensioned tie member within the groove without touching the molded component, the filler component when inserted entirely surrounding said tensioned second component.

The first alternative according to which the tie component is tensioned before being placed into the groove of the molded component, represents a specific feature of my invention since it allows the tie component to be tensioned over long lengths against anchorages and a plurality of molded elements to be placed side by side in such a way that the tensioned tie is located in the grooves, the tensioned tie component being anchored to the ends of such molded components by gripping wedging or the like.

Another object of my invention is to use tie members of high strength steel (rods and/or wires and/or cables), the tensioning force persisting in the tensioned tie members being of such magnitude that full prestressing of the structural member is ensured with permanent compressive stresses at the usual tensile zone of the sections, when under working load, even after the greatest possible losses of the initial prestress have taken place, thus ensuring cracklessness.

Another object of my invention is to use as the third filler component an adhesive substance, capable of forming a bond with the tie member and with the molded component.

Another object of my invention is to use as third, i. e. filler, component a plastic cohesive substance which does not form a bond with the tie member, thus permitting the performance of later alterations of the degree of tension in the tie member.

A further object of my invention is to transmit the pre-compression by means of anchorages, using for example bearing plates at the ends of the tensioned tie component, such anchorages being either permanent or temporary, in the latter case the filler component consisting of an adhesive substance capable of forming a bond with the tie member and with the molded component, which filler, after its hardening and after the removal of the temporary anchorages, transmits the tension in the tie member to the molded component.

In order to show the special advantages of my invention it is necessary to discuss briefly the principal systems and methods of prestressing.

The history of prestressing is described in my paper "Fully and Partly Prestressed Reinforced Concrete" (Journal, American Concrete Institute (A. C. I.) vol. 16, No. 3, January 1945).

"Prestressing" generally denotes that the reenforcement is tensioned before the load is applied, the stretching force being transmitted as compression to the concrete when the latter has attained sufficient strength to take up the stresses occurring at this stage. By this process stresses are imparted to the structure of opposite sign to those occurring under load. "Prestretching" and "post-stretching" indicate whether the tensioning is carried out before or after hardening of the concrete. With "pre-stretching" the products have generally to remain in the molds until the stretching force, produced by tensioning the reenforcement against anchorages at its ends, can safely be transmitted to the concrete, which is done mainly by bond, whereas "post-stretching" is carried out against the hardened body of the concrete. In the latter case, the molds can be removed soon after production but special provisions at the ends of the reenforcement are necessary for the transmission of the compression to the concrete, there being, generally, no bond between the reenforcement and the concrete.

With pre-stretching, at the release of the stretching force on the concrete, the initial prestress is immediately reduced owing to the elastic deformation of the concrete (shortening) and to shrinkage, which losses gradually increase later by further shrinkage and plastic flow of the concrete. With post-stretching no immediate losses arise due to the elastic deformation of the concrete and to the first part of shrinkage, but such a loss, due to friction, may take place, if the reenforcement is prevented from extending freely.

The practical application of prestressing was of no practical or economical importance as long as the initial prestress was within the limit of the permissible stresses of mild steel i. e. 20,000 p. s. i. in order to meet the existing regulations, since the losses of the prestress were too great and the precompression became gradually ineffective.

There is a distinct difference between "pre-stretching" and "post-stretching" in regard to the effectiveness of the initial prestress and the behaviour of the structure. With post-stretching a relatively greater stretching force remains effective than with pre-stretching. However, owing to the lack of bond between the reenforcement and the concrete, the total and permanent deformations and widths of cracks are greatly increased, as compared with constructions in which at least a considerable part of the reenforcement is bonded to the concrete.

My present invention represents in most of its applications the process of post-stretching and offers all the advantages of this process, i. e. it allows a mass production of members or the manufacture of a reenforced concrete construction in place, without the necessity of leaving the products in the molds until the concrete is hardened and has attained such a strength that the pre-compression can be safely transmitted thereto. A further advantage as compared with nearly all the methods of post-stretching consists in the fact that any loss due to friction is avoided, the tie members having applied thereto a prestress of uniform magnitude over the whole length. To a certain extent nearly in all the existing methods of post-stretching the reenforcement touches the concrete, the bond being broken or its formation being avoided, and said reenforcement is thus prevented from extending entirely freely. The only known arrangement which allows the tension to be applied uniformly over the whole length, is a construction in which the reenforcement is located within pipes, without touching them. In addition to these advantages, by providing a third, i. e. filler, component further advantages are affected. When this filler component consists of an adhesive substance, an additional bond is obtained between the filler on the one hand and the tying component and tie on the other hand, thus obtaining the specific advantages of pre-stretching i. e. reduction of total and permanent deformation and cracks. Such an arrangement thus offers a combination of the advantages of pre-stretching and post-stretching. It is, however, also possible to use as filler a plastic, cohesive material, thus protecting the reenforcement from corrosion and allowing of a later re-adjustment of the tensioning, which cannot be effectively carried out in other known systems in which the reenforcement touches the concrete and friction between concrete and reenforcement prevents a uniform extension of the reenforcement. A certain friction between the ties and the filler will also exist in a structural member according to my system in the event of readjustment, but this friction will be considerably smaller than that occurring between ties and concrete, since the filler consists of a cohesive material.

A special application of my invention allows of a great simplification of the tensioning process. Whereas with post-stretching, usually, the stretching process has to be carried out for each member separately, the pre-compression being transmitted at the ends by bearing plates to the hardened body of the concrete, it is possible according to my invention to tension the ties in long length against anchorages at their ends. The hardened molded members preferably manufactured by methods of mass production, are brought into position, the tensioned tie members being located in the grooves thereof. At the ends of each member simple gripping and anchor devices are used, having e. g. jaws to grip the tensioned ties or wedges to fix them. When the ties at the ends of all members in one length have been gripped the ties are cut off and the precompression is transmitted to the individual members.

There are two further alternative solutions according to one of which the pre-compression is first temporarily transmitted to the molded concrete and an adhesive filler is used, permanently transmitting the pre-compression, and according to the other, the pre-compression is directly transmitted by the filler to the molded component; in the latter case, the single members remain with the tensioned ties until the filler has hardened. These two alternative solutions do not represent a process of post-stretching but one of pre-stretching with all the advantages and disadvantages of such a process. However, they permit the use of the further advantage of my invention, namely the tensioning of single ties over long length and the separate production of the individual molded members by mass production.

The accompanying drawings show diagrammatically methods of carrying my invention into practice.

In the drawings, Figure 1 is a view, in front elevation, of a composite beam according to my invention;

Figures 2 to 6 are cross sections through such beams, as shown in Figure 1, of reenforced concrete.

Figures 7 and 9 are lateral views, illustrating methods of assembly of composite structural members according to my invention;

Figures 8, 10 and 11 are fragmentary longitudinal sections, in enlarged size, illustrating details of the methods of assembly, shown in Figures 7 and 9;

Figure 12 is a fragmentary cross section, in enlarged size, illustrating details of one method of assembly, shown in the Figures 9 and 11;

Figures 13 and 14 are cross sections illustrating other methods of assembly;

Figure 15 is a view, in front elevation of an anchor plate with gripping devices.

Figure 16 is a lateral view of the gripping device, shown in Figure 15;

Figures 17 and 18 are stress diagrams;

Figure 19 is a fragmentary view, in front elevation, illustrating tensioning devices which may be used when the molded component is made in place;

Figure 20 is a fragmentary cross section through the tensioning device, shown in Figure 19.

In Figure 1, a longitudinal view (without the filler c), and in Figure 2, a cross section, there is illustrated a composite structural member according to my invention comprising the molded component a, consisting of a reenforced concrete element 1 of rectangular section, having grooves or recesses along the two lower outside corners, two components b, consisting of prestressed tying members and two components c, consisting, for example, of adhesive cement mortar entirely surrounding the component b. In the molded reenforcement concrete element 1 there are provided longitudinal reenforcing members 2 (at the lower tensile zone) and 3 (at the upper compressive zone) with transverse links 4, the latter preferably consisting of 2 parts 4a and 4b, as shown in Figure 2a, thus allowing the tieing elements b simply to be lodged in longitudinal external grooves or recesses 5 formed in the element 1, the two link-reenforcements then being connected to the ties b for instance by twisting them together when wire-links are used or by hooking them round the tying elements b when the links are in the form of rods or strips, as shown in Figures 2 and 2a. At the ends of the tying elements b anchor plates 6 are provided, preferably in recesses 7 in the beams in order to permit of filling these recesses with the filler c, thus protecting also the anchorage means against rusting and/or fire. Figure 3 shows, in section, an alternative form of beam in which the grooves or recesses 5 and the fillers c are not at the lower corners but near to the lower end of the side surfaces, no longitudinal reenforcing members 2 being provided. Another rectangular section of a composite structural member according to my invention is shown in Figure 4 in which there is provided one groove or recess 5 in the lower surface wherein two tying members b are arranged and another groove or recess 5' in the upper surface of the section where one tying member b' is located, the longitudinal reenforcement 2 being relatively weak and provided only for the purpose of positioning the links 4 which consist of two C-shaped parts, the ends of which extend into the grooves or recesses 5 and 5' and are closed after the tying members b and b' have been lodged in their grooves or recesses 5 and 5' respectively. Figure 5 illustrates a similar section but without having longitudinal reenforcing members 2 and 3, the links 4 consisting of single members extending into the grooves or recesses 5 and 5' and bent around the tying members b and b' after they have been fixed. But said links 4 need not be connected with the ties b and b' and may be provided only in the interior of the sections, shown in Figures 2 and 4, without extending into the grooves or recesses or may be dispensed with altogether in a section according to Figure 5. An upper tying member b' is preferably provided when the composite structural member is to be fully pre-stressed. Figure 6 shows a T-section, only one groove or recess 5 being provided along the lower surface and the longitudinal reenforcement 2 being relatively stronger than that occurring in the section described in Figure 4, the links 4 consisting preferably of 2 parts which are closed after the tying member b has been lodged in the groove or recess. When a longitudinal reinforcement 2 of considerable area is provided, as illustrated in the Figures 2 and 6, it is advisable to carry out a partial pre-stressing of the tying members.

It is to be understood that the invention is equally applicable to reenforced concrete components a of other cross sectional shapes than those described in Figures 2 to 6, such as for instance I-shaped beams and to reinforced concrete constructions generally, strained in one or more directions, representing the component a.

In the following there are shown simple methods of manufacture of such composite structural members according to my invention, as described in the examples Figures 1 and 6.

One method, illustrated in Figures 7 and 8 refers to the use of thin wire-ties b, when two grooves or recesses 5 are provided, as shown in Figure 2. In such a case said wire-ties b are wound round the moulded element 1 which is laid in a horizontal position with the grooves upwards, say, on a platform or on some support 8. Anchor-plates 6 are provided, having therein smaller groove 9 which allow of positioning of the wire-ties b in the grooves or recesses 5 so as to ensure a requisite distance from the outside fibre, the plates 6 herein afterwards covered by the filler c, and the ties b being prevented from touching the molded elements at the grooves or recesses. The wire-ties b which are wound round the elements 1 form at the one end a loop 10 through which a bar 11 is passed and turned, being used as lever, until the requisite tension is attained which can be ascertained by means of an extensometer or by the pitch of tone, corresponding to the pre-stress for a free span between the anchor plates 6, arranged at the ends of the beam 1, where the tying members b are supported at the grooves 9 of said anchor-plates 6. The bar 11 may then be replaced by a short piece which serves as anchorage of the tensioned wire ties b, the pressure resulting from the tensioning being transmitted to the end surfaces of the beam 1 by the anchor-plates 6. The grooves or recesses 5 and recesses 7 are now filled with a non liquid cement mortar or concrete which can be done thoroughly and completely since the grooves are at the outside surface at the supper side. Since the mortar is preferably applied in rather dry consistency, it is possible according to my invention to ensure a greater strength than that occurring with more liquid mortars. It is possible and advisable to ensure a good bonding of the filler c and the component a by a special roughening or like treatment of the surface of the grooves or by arrangements of an interlocking in any known manner. This method is limited to the use of thin wire or of several wires laid one beside another, which are wound round the grooves as described. When the wire is too thick it is difficult to bend it as is required when it is wound round the grooves or recesses. It is, of course, possible to apply this method also to beams of sections according to Figures 3 and 5. But in the latter case only if the tie section and the tensioning force is the same at the upper and lower side. In such cases the two grooves or recesses have to be filled separately in different positions of the beams with the grooves or recesses at the upper side.

Another possibility of carrying out my invention into practice is shown in Figures 9 and 10, rods or bars being used as tying members b. A molded reenforced concrete beam representing the component *a* according to Figure 4 is placed in a horizontal position with its groove or recess 5 upwards, laid, say on a platform 8 or other suitable support. The two tie-rods *b* are provided with screw-threads 14 at their ends and are brought into the groove or recess 5, and positioned by means of holes 12 provided in the anchor-plates 6 through which they are threaded. Tensioning is carried out by tightening nuts 13 on the threaded ends 14 of the tie-rods, thus engaging the anchor-plate 6, which bridge the groove or recess 5 and transmit the pressure resulting from tensioning to the end surfaces of the component *a*. The degree of tensioning is measured by the elongation. Where the groove or recess 5 is too wide to allow of an economic bridging of the anchor-plates 6 special ledges 15 may be provided in the molded component *a* at the ends of the groove or recess 5 and adjacent to the recesses 7 which ledges have smaller grooves 16 which represent the part which is bridged by the anchor-plates 6, as shown in Figure 11, representing an enlarged longitudinal section through the groove or recess 5, corresponding to Figure 10, the cross end view of the composite structural member shown in Figure 9. Figure 12 is a cross-section through a part of a section showing the ledge 15 and grooves 16 in view. The groove or recess 5 and the recesses 7 are thoroughly filled with the adhesive cement mortar concrete or the like as described hereinbefore.

Another method of simple assembly of a plurality of units is illustrated in Figures 13 to 16. In these cases the tying members *b* are tensioned before they are lodged in the grooves or recesses of the single units. A number of such tying members *b*, consisting of wire or cable, according to the cross sections of Figures 13 and 14 are arranged one above another and/or one beside another. Said ties *b* are tensioned between anchorages for a relatively great length by any known pulling device, for example when thin wires are used by winding them up round screws like a piano. The single molded elements *a* are placed on a platform 8 or similar support, one unit along another, in such a way that preferably two tensioned ties are lodged within the respective groove or grooves (recess or recesses). The anchor-plates 6 bridging the grooves, preferably arranged at recesses 7 as described hereinabove, may have jaws 17 to grip the tensioned tying members *b*, as shown in Figures 15 and 16. Figure 15 shows in elevation such an arrangement for a beam having two grooves 5, as shown in section in Figure 2. Said jaws 17 are formed by fixing the part 20 which may be supported at one side by ledges 19 of the anchor-plate 6 (or may be hinged thereto) by a screw 21 to the cantilever 18 of the anchor-plate 6. I have used such gripping means for fixing the devices for measuring the steel-elongations to the reenforcement of high strength steel rods and wire, which arrangement has proved most satisfactory. Once gripped, even for untensioned thin wires of small diameter and great strength, no loosening of the gripping has occurred even at a relatively great increase of the straining of the said wires nearly to failure, resulting in a reduction of the cross section. Such a gripping may therefore be considered as fully reliable. But any other known means for gripping may be employed as for instance a clamping of the piece 20 or even a more simple solution by fixing said piece 20 with thin wire being wound round the arms 18 and the tying members *b* and twisted together or even only by fixing the tying members *b* with wire to the arms 18 without pieces 20. If the recesses 7 are filled with cement mortar *c* such an anchorage would suffice, the cement mortar preventing any loosening of the connection.

Another way of gripping may be effected by wedging the tying members *b* against suitably shaped anchor-plates 6.

After all tying members *b* having been gripped to the anchor and bearing plate 6, which have to lie tightly against the end surfaces of the element *l* at the recesses 7, all ends of the ties *b* of all units in the same layer of the wires are cut near to the gripping means and by that process the pressure resulting from the tensioning is transmitted to the end faces of the moulded elements at the recesses. The filler is brought into the grooves and recesses in the same way as described hereinbefore. It is, of course, possible first to place the elements *a* and afterwards to tension the ties *b*. It is also possible to grip the ties only temporarily and to remove the gripping and bearing devices after the adhesive filler *c* has hardened, thus ensuring bond with both the components *a* and *b*. It would be possible to transfer the pre-compression to the component *a* only by virtue of the bond of the adhesive filler *c* without using temporary gripping devices when allowing the filler *c* to harden before the wires are cut. In all these cases it will be advantageous to locate the wires in such a way that the adhesive filler *c* entirely surrounds the ties *b*. However, when the said ties *b* are tensioned before the elements *a* are placed in position, and when the pre-compression is transmitted by bearing plates, it does not matter if the tensioned wires *b* touch the surface of the moulded component *a*, uniform tension along the wires being already ensured.

In all these cases the same result is obtained by transmitting the tension created in the components *b* as pressure to the components *a* as with post-stretching. By adding an adhesive filler *c* which is bonded to the components *a* and *b* a further improvement is attained. Such a section according to my invention differs therefore from one of pre-stressed reenforced concrete not only by the simplification in manufacture but also by a different co-operation of the three components in reenforced concrete.

A reenforced concrete structure with an additional adhesive filler according to my invention, as described hereinabove, may therefore be defined as a composite construction in which the pre-stress is transmitted to the molded component *a* at the ends of the tensioned members *b*, similar to post-stretching in the case of reenforced concrete of prior practice and not by bond, thus differing from pre-stressed constructions with pre-stretched reenforcement of prior art, and where an additional bond is secured by the adhesive filler component *c*. In the same way as with post-stretching the losses of the initial pre-stress are therefore greatly reduced as compared with pre-stretching. A specially good bond between the component *c* and the components *a* and *b* can be ensured by special treatments and arrangements, as described hereinabove.

It is possible to tension the tying elements to such an extent that "full" pre-stressing is ensured, the stress-distribution under designed load, after the greatest possible losses of the initial pre-stress have taken place, being according to Figure 17, only permanent pressure occurring in the various sections (compressive stresses $f_1$ and $f_2$ at the outside fibres). The great stretching force required for "full" pre-stressing and the great straining occurring at transmitting the stretching force upon the molded component $a$ renders such a solution necessary only for structures when a guarantee of cracklessness under working load is of great importance such as for example for tank barges etc. In all other cases partial pre-stressing is preferably carried out, causing a stress-distribution according to Figure 18 with a tensile stress $f_2'$ in the most unfavourably stressed section in a straight line stress-distribution which tensile stress is of a magnitude representing a considerable part of the tensile strength of the concrete. In the examples shown in Figures 2 and 6, a longitudinal reenforcement 2 of considerable amount is provided in the molded component $a$, which unstretched reenforcing members 2 are pre-compressed at the transmission of the tensioning force and in addition co-operate with the ties $b$ as pre-compressed, untensioned, bonded tensile reenforcement, whereas in the examples shown in Figures 3 and 5 without such reenforcing members 2, and in example Figure 4 with relatively weak members 2, the pre-stressed tying members $b$ alone serve as tensile reenforcement of the composite structure, when strained by bending.

If the adhesive filler $c$ consists of a cement mortar or another material different from the concrete of the moulded component $a$, the articles thus obtained distinguish themselves generally from reenforced concrete articles according to prior art, independent of the different method of production favouring mass production, by the fact that there are three components: concrete $a$, ties $b$ and a filler $c$ preferably entirely surrounding said ties of a material different from concrete instead of two components "concrete" and "reenforcement" in each case either the whole reenforcement being tensioned or a part being tensioned and a part unstretched.

But even if the filler $c$ were of the same material as the molded component $a$ (i. e. concrete), there would be a difference not only in the process of manufacture, since the reenforcement is not distributed "in" the concrete, when the tensioning process is carried out, but also in the way of co-operation of the components between pre-stressed reenforced concrete articles of prior art, as discussed above, and between such according to the present invention, as pointed out hereinbefore, since in articles according to the present invention the stretching force is effectively transmitted at the ends of the ties as in the known case of "post-stretching" further a uniform tension along the entire length of the ties $b$ is ensured (which is not attained with many methods of post-stretching in which losses due to friction occur along the ties $b$) but moreover the tensioned reenforcement is effectively bonded by means of the filler to the concrete of the molded component as in the case of "pre-stretching" as previously known. The main features of transmission of the stretching force to the concrete, in articles having a "pre-stretched" or "post-stretched" reenforcement as known according to prior art, are thus combined according to the present invention. It has to be, however, pointed out that concrete could be used as filler $c$ only in such cases where the grooves are of comparatively great section, thus permitting the space between the tie $b$ and the molded component $a$ to be filled with the coarse aggregate of the concrete.

On the other hand articles in which the pre-compression is transferred by the bond between the adhesive filler $c$ and the components $a$ and $b$ only, no permanent gripping devices being used, are in their behaviour similar to known pre-stretched articles. They do not present the combined advantages of pre-stretching and post-stretching. However they allow an improved method of manufacture by enabling mass production methods to be applied.

In Figure 19, a side elevation shows diagrammatically how my method can be carried out into practice in the case of a molded component $a$ built in place. Grooves or recesses 5 are provided in the outside surface of the component $a$ in the required length having cavities 22 and 22a at their ends. The tying members are brought into the grooves or recesses as shown in the section Figure 20, and are anchored in any known manner to an anchor-plate 6 which is placed in the cavity 22a. At the other cavity 22 there is embedded a screw 23 in the component $a$ with a part of its threaded shank 24 projecting, and a reel 25 or spool having an internally threaded bore may be provided upon such projecting shank. The wire ties $b$ are wound around this reel or spool, which may then be moved upon the shank in a helical manner, preferably by means of a key with a long lever, in order to apply tension to the wire-ties to the requisite degree. Afterwards a nut 24a may lock the attained position and the filler $c$ is brought into the groove or recess 5 and the cavities 22 and 22a which are thus sealed. It is, of course, possible to apply any other tensioning device which serves at the same time as anchorage at the one side in the cavity 22 and to ensure anchorage at the other side by having the end or the ends of said tying members $b$ bonded in the concrete of the component $a$, thus dispensing with the cavity 22a.

It is also possible to provide instead of an adhesive filler a cohesive, plastic filler $c$ in the grooves, recesses or cavities, in which case no additional bond due to the third component occurs, but such a solution allows of a later re-adjustment or even of an alteration of the degree of tensioning at any time without difficulties where the tensioning means are embedded in the cavities or recesses. This is the case by arrangements according to Figures 7 to 10 and Figures 19 and 20. In the case the tensioned ties are gripped, special pulling devices would be required for such re-adjustments or alterations of the degree of tensioning.

I claim:

1. A method of manufacture of a composite structural member intended in use to be strained mainly by bending consisting of three components, comprising forming a first component of considerable compressive strength by molding in an integral whole from a plastic, non-metallic substance which may be steel reenforced, providing at least one straight, symmetrically arranged groove in at least one external surface of said molded component, disposing a tie member, forming the second component, in said external groove of said molded component, applying a tensile pre-stress in excess of 20,000 lbs. per sq. in. to said tie member, ensuring the tensile force thus produced in said tie member to be of uniform value entirely throughout the length of said tie member, inserting into said external groove a filler substance forming the third component of the composite structure, transmitting the tensile force occurring in said tie due to its prestress, as compression to the said molded component, and maintaining a tensile force in the tie and consequently also a compression transmitted to the molded component of a predetermined minimum value after all losses of the prestress owing to shrinkage and plastic flow of the molded component have taken place.

2. A method of manufacture of a composite structural member according to claim 1, comprising providing anchorages at the ends of said molded component, for the transmission of the compression to the molded component, and using a filler of an adhesive nature, capable of forming a bond with the tie member and the molded component.

3. A method of manufacture of a composite structural member according to claim 1, comprising providing anchorages at the ends of said molded component for the transmission of the compression to the molded component, and using a filler of a plastic cohesive nature which does not form a bond with the tie member, in order to enable any desired adjustment of the degree of tension in the tie member to be effected.

4. A method of manufacture of a composite structural member according to claim 1, comprising disposing anchorage devices at the ends of said groove formed in said molded component, temporarily transmitting the compression by means of said anchorage devices to the molded component, using a filler of an adhesive substance, capable of forming a bond with the tie member and the molded component, allowing said adhesive filler to harden and to form a bond with both the molded component and the tie member, removing said anchorage devices after hardening of the filler and the formation of said bond, and thereby transmitting the tension in the tie as compression in the molded compound through such bond.

5. A composite structural member intended in use to be strained mainly by bending consisting of three components, comprising a first component of considerable compressive strength formed in an integral whole by molding from a plastic, non-metallic substance, which molded component may be steel reinforced, at least one straight, symmetrically arranged groove being formed in at least one external surface of said molded component, a second component consisting of at least one metal tie member disposed in said groove in the molded component and having applied thereto a tensile prestress in excess of 20,000 lbs. per sq. in. in such a way that the tensile force thus produced is of uniform magnitude entirely throughout the length of said tie member, and a third component consisting of a filler substance arranged in said groove in said molded component, the tensile force occurring in said tie due to the prestress being transmitted as compression to the molded component, there persisting an effective tensile force in the tie and consequently also a compression transmitted to the molded component of predetermined minimum value, after all possible losses of the prestress owing to shrinkage and plastic flow have taken place.

6. A composite structural member according to claim 5, in which the tie member is of high strength steel and the tensioning force persisting in the tensioned tie member is of such magnitude that full prestressing of the structural member is ensured with permanent compressive stresses at the usual tensile zone of the sections, when under working load, even after the greatest possible losses of the initial prestress have taken place, thus ensuring cracklessness.

7. A composite structural member according to claim 5, in which the filler substance comprises an adhesive substance capable of forming a bond with the tie member or molded component.

8. A composite structural member according to claim 5, in which the tensile force in the tie member due to the prestress is transmitted to the molded component by means of anchorages provided at the ends thereof, and in which the filler consists of an adhesive substance, capable of forming a bond with the tie member and with the molded component.

9. A composite structural member according to claim 5, in which the tensile force in the tie member due to the prestress is transmitted to the molded component by means of anchorages provided at the ends thereof, and in which the filler consists of a plastic cohesive substance, which does not form a bond with the tie member, thus permitting the performance of later alterations of the degree of tension in the tie member.

10. A composite structural member according to claim 5 in which the tensile force in the tie member due to the prestress is temporarily transmitted to the molded component by means of anchorages provided at the ends thereof, and in which the filler consists of an adhesive substance capable of forming a bond with the tie member and with the molded component, which filler transmits after its hardening and after the removal of the temporary anchorages the tension in the tie member to the molded component.

PAUL WILLIAM ABELES.

REFERENCES CITED

The following references are of record in the file of this patent:

UNITED STATES PATENTS

| Number | Name | Date |
|---|---|---|
| 375,999 | Jackson | Jan. 3, 1888 |
| 1,334,881 | Bennett | Mar. 23, 1920 |
| 2,035,977 | Nichols | Mar. 31, 1936 |
| 2,075,633 | Anderegg | Mar. 30, 1937 |
| 2,080,074 | Freyssinet et al. | May 11, 1937 |
| 2,101,538 | Faber | Dec. 7, 1937 |
| 2,102,447 | Whitacre | Dec. 14, 1937 |
| 2,234,663 | Anderegg | Mar. 11, 1941 |
| 2,255,022 | Emperger | Sept. 2, 1941 |
| 2,270,240 | Freyssinet | Jan. 20, 1942 |
| 2,315,895 | Crom | Apr. 6, 1943 |
| 2,319,105 | Billner | May 11, 1943 |
| 2,329,670 | Sanchez | Sept. 14, 1943 |

FOREIGN PATENTS

| Number | Country | Date |
|---|---|---|
| 338,864 | Great Britain | Nov. 18, 1930 |
| 452,126 | Great Britain | 1934 |